US012689618B2

(12) United States Patent
Watanabe

(10) Patent No.: US 12,689,618 B2
(45) Date of Patent: Jul. 21, 2026

(54) INFORMATION PROCESSING APPARATUS, INFORMATION PROCESSING APPARATUS CONTROL METHOD, AND STORAGE MEDIUM

(71) Applicant: CANON KABUSHIKI KAISHA, Tokyo (JP)

(72) Inventor: Miho Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 18/779,161

(22) Filed: Jul. 22, 2024

(65) Prior Publication Data

US 2025/0063031 A1     Feb. 20, 2025

(30) Foreign Application Priority Data

Aug. 14, 2023     (JP) ................................. 2023-131771

(51) Int. Cl.
H04L 9/40          (2022.01)
(52) U.S. Cl.
CPC ............ H04L 63/08 (2013.01); H04L 63/105 (2013.01)
(58) Field of Classification Search
CPC .............................. H04L 63/08; H04L 63/105
USPC ............................................................ 726/4
See application file for complete search history.

(56) References Cited

U.S. PATENT DOCUMENTS 10,873,469 B2 *  12/2020  Kakutani ............. H04N 1/0097
12,225,016 B2 *  2/2025  Amano ............... H04L 63/0861

| | | | | |
|---|---|---|---|---|
| 2002/0194003 A1 * | 12/2002 | Mozer | ..................... | G10L 17/00 |
| | | | | 704/270.1 |
| 2009/0185220 A1 * | 7/2009 | Yasuhara | ................ | G06F 21/31 |
| | | | | 358/1.15 |
| 2009/0287837 A1 * | 11/2009 | Felsher | ............... | G06F 21/6245 |
| | | | | 709/229 |
| 2010/0002666 A1 * | 1/2010 | Mukai | ................... | H04W 12/06 |
| | | | | 370/338 |
| 2011/0004925 A1 * | 1/2011 | Giordani | ................ | G06F 21/34 |
| | | | | 726/4 |
| 2011/0109427 A1 * | 5/2011 | Mihira | ................. | G06F 21/608 |
| | | | | 358/1.14 |

(Continued)

FOREIGN PATENT DOCUMENTS

JP          2022131236 A      9/2022

OTHER PUBLICATIONS

Extended European Search Report dated Nov. 15, 2024 in counterpart European Patent Appln. No. 24190833.

*Primary Examiner* — Dant B Shaifer Harriman
(74) *Attorney, Agent, or Firm* — Venable LLP

(57) ABSTRACT

An information processing apparatus includes a second reception unit capable of receiving an instruction to set second setting for executing authentication with a second server by a second authentication scheme having a security level at a second level higher than a first level, a second authentication unit configured to execute authentication with the second server by the second authentication scheme based on reception of the instruction to set the second setting, and a control unit configured to perform, based on reception of the instruction to set the second setting by the second reception unit, control to prevent reception of an instruction to set first setting for executing authentication with a first server by a first authentication scheme having a security level at a first level.

15 Claims, 10 Drawing Sheets

(56)          References Cited

U.S. PATENT DOCUMENTS

| | | | |
|---|---|---|---|
| 2011/0261386 A1* | 10/2011 | Kasuya | G06F 21/608 |
| | | | 358/1.14 |
| 2012/0102559 A1* | 4/2012 | Yoshida | G06F 21/6245 |
| | | | 726/7 |
| 2012/0291106 A1* | 11/2012 | Sasaki | G06F 21/556 |
| | | | 726/5 |
| 2013/0054611 A1* | 2/2013 | Lee | G06F 16/182 |
| | | | 707/E17.083 |
| 2013/0055359 A1* | 2/2013 | Sasaki | H04L 63/105 |
| | | | 726/4 |
| 2014/0380431 A1* | 12/2014 | Alonso Cebrian | H04L 63/08 |
| | | | 726/4 |
| 2015/0029533 A1 | 1/2015 | Sato | |
| 2015/0052591 A1* | 2/2015 | Miura | A01B 79/005 |
| | | | 726/4 |
| 2015/0199155 A1* | 7/2015 | Cho | G06F 3/1222 |
| | | | 358/1.14 |
| 2015/0281959 A1* | 10/2015 | Yokota | H04W 12/08 |
| | | | 726/7 |
| 2017/0004665 A1* | 1/2017 | Chang | G07C 9/00309 |
| 2017/0180388 A1* | 6/2017 | Belz | H04L 63/0853 |
| 2018/0285544 A1* | 10/2018 | Chang | G06V 40/172 |
| 2022/0277090 A1 | 9/2022 | Narita | |
| 2023/0412583 A1* | 12/2023 | Purta | H04L 61/5007 |
| 2025/0063031 A1* | 2/2025 | Watanabe | H04L 63/08 |

* cited by examiner

400

410

INFORMATION PROCESSING APPARATUS, INFORMATION PROCESSING APPARATUS CONTROL METHOD, AND STORAGE MEDIUM

BACKGROUND OF THE INVENTION

Field of the Invention

The present disclosure relates to a technology of controlling an authentication operation at an information processing apparatus.

Description of the Related Art

An image processing apparatus such as a printer has various communication functions. The image processing apparatus is a kind of an information processing apparatus. In the image processing apparatus, server connection setting used for communication with various servers can be set. For example, assume a case where a communication target is a mail server. In this case, Post Office Protocol (POP) or Simple Mail Transfer Protocol-Authentication (SMTP-AUTH) can be set as exemplary server connection setting. In addition, Open Authorization 2.0 (OAuth 2.0) can be set. A user can select and set desired server connection setting.

POP and SMTP-AUTH are schemes in which authentication is performed by using a password, and are performed by a client and an authentication server. In these server connection schemes, the authentication server requests a password from the client when the client requests data from the authentication server, and the authentication server transmits the data to the client in a case where authentication is successful.

OAuth 2.0 is a scheme in which authorization is performed by using an access token, and is performed by a client, an authorization server, and a resource server. The authorization server queries a user for token issuing permission when the client requests a token from the authorization server. In a case where the token issuing permission is accepted by the user, the client can receive data from the resource server by using the token obtained from the authorization server. OAuth 2.0 can prevent leakage of information such as a password and thus is employed as a high security server connection scheme.

There are technologies of controlling a setting screen to improve security in such server connection setting. Japanese Patent Laid-Open No. 2022-131236 discloses a technology of controlling a setting screen for server connection setting in accordance with the status of administrator authority and user authentication on a server connection setting screen of an image processing apparatus.

Technologies capable of improving security have been desired.

SUMMARY OF THE INVENTION

An information processing apparatus according to an aspect of the present disclosure includes a first reception unit capable of receiving an instruction to set first setting for executing authentication with a first server by a first authentication scheme having a security level at a first level, a first authentication unit configured to execute authentication with the first server by the first authentication scheme based on reception of the instruction to set the first setting, a second reception unit capable of receiving an instruction to set second setting for executing authentication with a second server by a second authentication scheme having a security level at a second level higher than the first level, a second authentication unit configured to execute authentication with the second server by the second authentication scheme based on reception of the instruction to set the second setting, and a control unit configured to perform, based on reception of the instruction to set the second setting by the second reception unit, control to prevent reception of the instruction to set the first setting by the first reception unit.

Further features of the present invention will become apparent from the following description of exemplary embodiments with reference to the attached drawings.

DESCRIPTION OF THE EMBODIMENTS

Preferable embodiments of the present disclosure will be described below in detail with reference to the accompanying drawings. The embodiments do not limit features of the present disclosure, and not all combinations of characteristics described in the embodiments are necessarily essential for solution of the present disclosure. Identical components are denoted by the same reference sign in the following description.

First Embodiment

The present embodiment will be described with an example in which server connection setting with a high security level can be preferentially set. In a case of a mail server, for example, POP and SMTP-AUTH are schemes of performing authentication by using a password. The security level of POP and SMTP-AUTH is referred to as a first level. OAuth 2.0 is a scheme of performing authorization by using an access token. As described above, OAuth 2.0 is server connection setting having a security level at a second level higher than the first level because leakage of information such as a password can be prevented. The terms "first level" and "second level" are used for relative comparison, and the ordinal numbers of the levels have no particular significance.

As described above, some server connection setting has relatively high security levels. However, a user (for example, an administrator user) unfamiliar with server connection setting cannot determine which server connection setting is suitable in some cases. Thus, even if server connection setting having a high security level is set, such a user unintentionally changes the server connection setting to setting having a low security level in some cases.

Thus, the present embodiment describes an example in which, in a case where server connection setting having a high security level is set, other server connection setting is prevented from being set by the user.

For example, in the present embodiment, in a case where OAuth 2.0 having a high security level is set, setting items related to other server connection setting are grayed out on a server connection setting screen for setting server connection. In this manner, server connection setting having a high security level is prevented from being unintentionally changed to other server connection setting by performing control that other server connection setting cannot be set by the user.

<Hardware Configuration>

Figure 1:
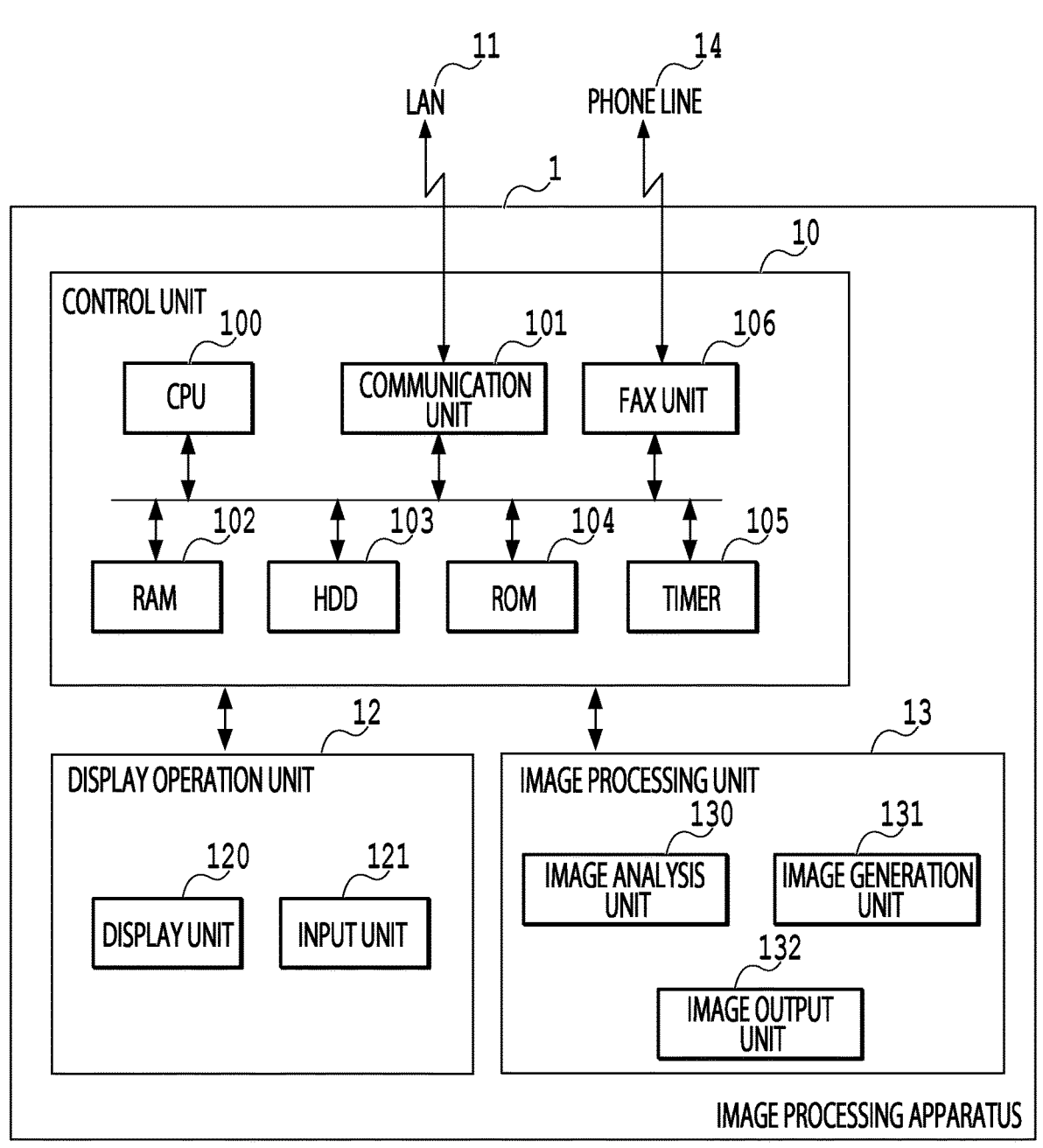
FIG. 1 is a block diagram for description of a hardware configuration of an image processing apparatus.

FIG. 1 is a block diagram for description of a hardware configuration of an image processing apparatus 1 according to the present embodiment. The image processing apparatus 1 includes a control unit 10, a display operation unit 12, and an image processing unit 13.

The control unit 10 performs operation control of each unit of the image processing apparatus 1. The control unit 10 includes a CPU 100, a communication unit 101, a RAM 102, a HDD 103, a ROM 104, a timer 105, and a fax unit 106. The CPU 100 controls the entire control unit 10. The communication unit 101 transmits and receives data through a LAN 11. The LAN 11 is a network for communicating data with an external apparatus, and the image processing apparatus 1 is connected to the Internet through the LAN 11. The external apparatus is, for example, a personal computer (PC).

The RAM 102 provides a system work memory for the CPU 100 to operate. The HDD 103 is a hard disk drive. The HDD 103 may be another storage apparatus such as a magnetic disk, an optical media, or a flash memory or may be any combination of thereof. The HDD 103 can store job data, setting data, and the like. The HDD 103 does not necessarily need to exist in the image processing apparatus 1. For example, an external server or personal computer may be used as a stored apparatus through the communication unit 101.

The ROM 104 is a boot ROM and stores a system boot program. The CPU 100 loads a computer program installed on the HDD 103 onto the RAM 102 by using the boot ROM of the ROM 104 and performs various kinds of control based on the computer program.

The timer 105 counts time in accordance with an instruction from the CPU 100 and notifies the CPU 100 by interrupt or the like when an instructed time elapses. The fax unit 106 transmits and receives fax data through a phone line 14.

The display operation unit 12 is controlled by the control unit 10. The display operation unit 12 includes a display unit 120 and an input unit 121. The display unit 120 is a display for displaying information of the image processing apparatus for the user. The input unit 121 receives inputs from the user through an interface such as a touch panel, a mouse, a camera, a voice input, or a keyboard.

The image processing unit 13 is controlled by the control unit 10. The image processing unit 13 includes an image analysis unit 130, an image generation unit 131, and an image output unit 132. The image analysis unit 130 analyzes the structure of a document image and extracts necessary information from a result of the analysis. The image generation unit 131 reads (scans) a document, generates image data by digitizing an image of the document, and stores the image data in the HDD 103. The image generation unit 131 may generate document image data of any other format by using information analyzed by the image analysis unit 130.

The image output unit 132 outputs image data stored in the HDD 103 and the like. The outputting is performed by, for example, printing document image data on a sheet or transmitting document image data through the communication unit 101 to an external device, a server, a facsimile apparatus, or the like connected to a network. The image output unit 132 may output and store image data to and in a storage medium connected to the image processing apparatus 1.

<Software Configuration>

Figure 2:
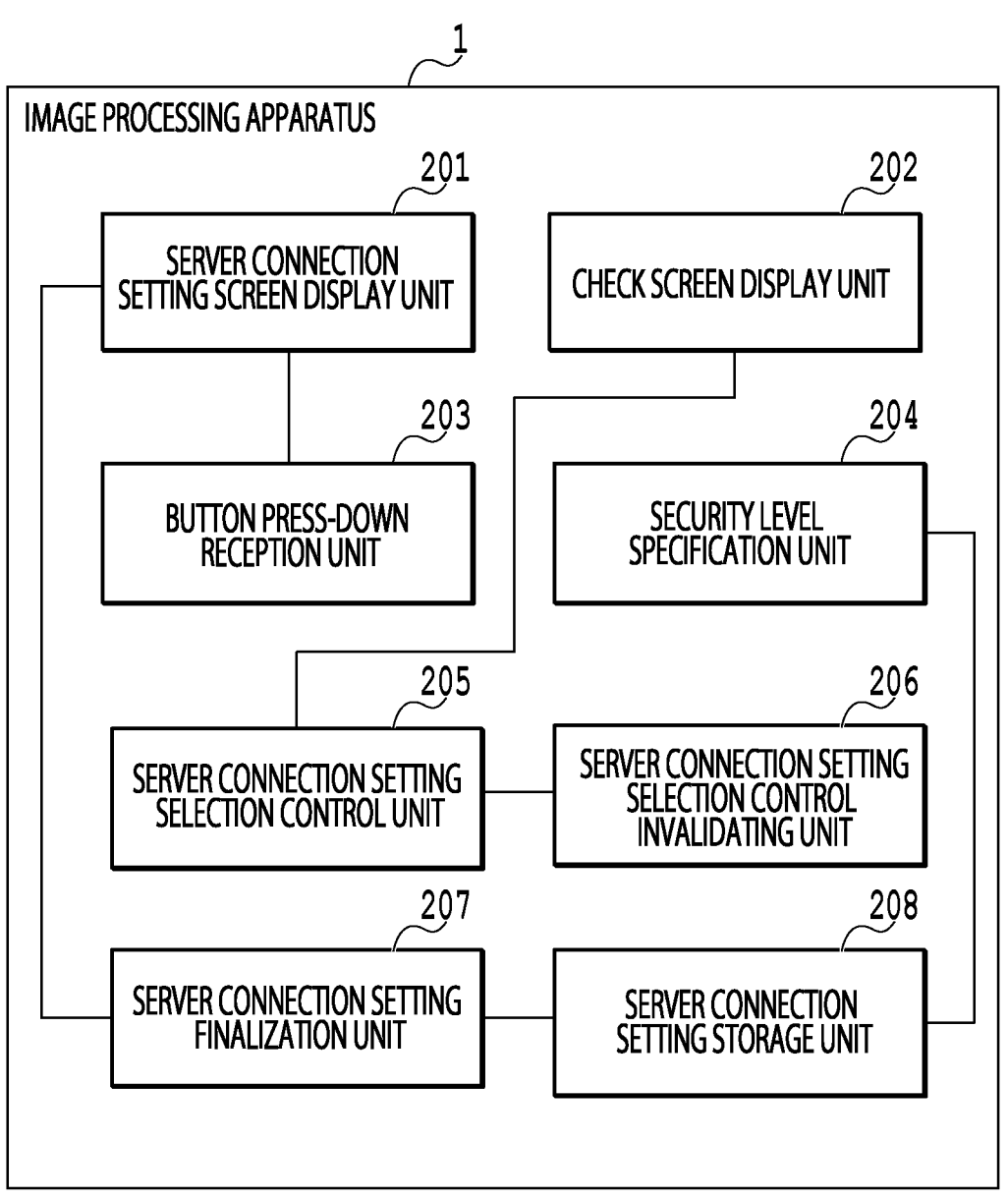
FIG. 2 is a diagram illustrating an example of a software configuration of the image processing apparatus.

FIG. 2 is a diagram illustrating an example of a software configuration of the image processing apparatus 1. The image processing apparatus 1 includes a server connection setting screen display unit 201, a check screen display unit 202, a button press-down reception unit 203, and a security level specification unit 204. The image processing apparatus 1 also includes a server connection setting selection control unit 205, a server connection setting selection control invalidating unit 206, a server connection setting finalization unit 207, and a server connection setting storage unit 208. These functional components are implemented as the CPU 100 loads a computer program installed on the HDD 103 onto the RAM 102 by using the boot ROM of the ROM 104 and executes the computer program.

The server connection setting screen display unit 201 performs processing of displaying a server connection setting screen. The check screen display unit 202 displays a screen for checking that server connection setting is to be changed. Specifically, the check screen display unit 202 displays the check screen in a case where server connection setting having a high security level is already set and a setting button for other server connection setting on the server connection setting screen is pressed down by the user. The check screen display unit 202 will be described later in a second embodiment.

The button press-down reception unit 203 receives button press-down by the user. The security level specification unit 204 specifies the security level of server connection setting already set or server connection setting selected by the user. In a case where server connection setting having a high security level is already set, the server connection setting selection control unit 205 grays out a setting region for any other server connection setting on the server connection setting screen. In a case where server connection setting having a high security level is invalidated, the server connection setting selection control invalidating unit 206 invalidates gray-out of a setting region for any other server connection setting on the server connection setting screen.

The server connection setting finalization unit 207 finalizes server connection setting. The server connection setting storage unit 208 stores server connection setting set by the user.

Each functional component illustrated in FIG. 2 is merely exemplary, and the present invention is not limited to the example. Any functional component other than those in FIG. 2 may be included, and some functional components in FIG. 2 may not be included.

<Setting Finalization Processing of OAuth 2.0>

Figure 3:
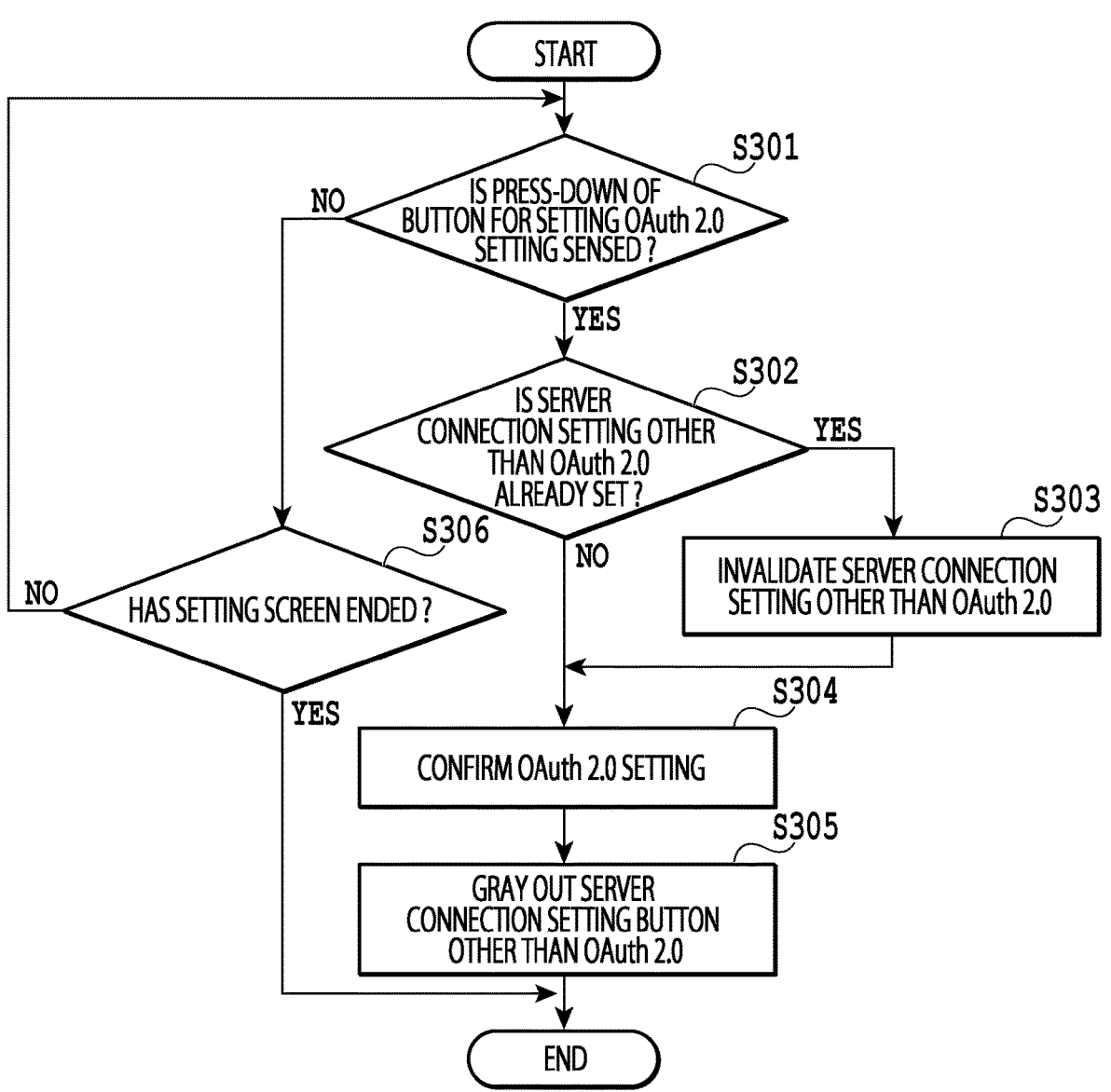
FIG. 3 is a flowchart illustrating an example of setting finalization processing of OAuth 2.0.
Figure 4A:
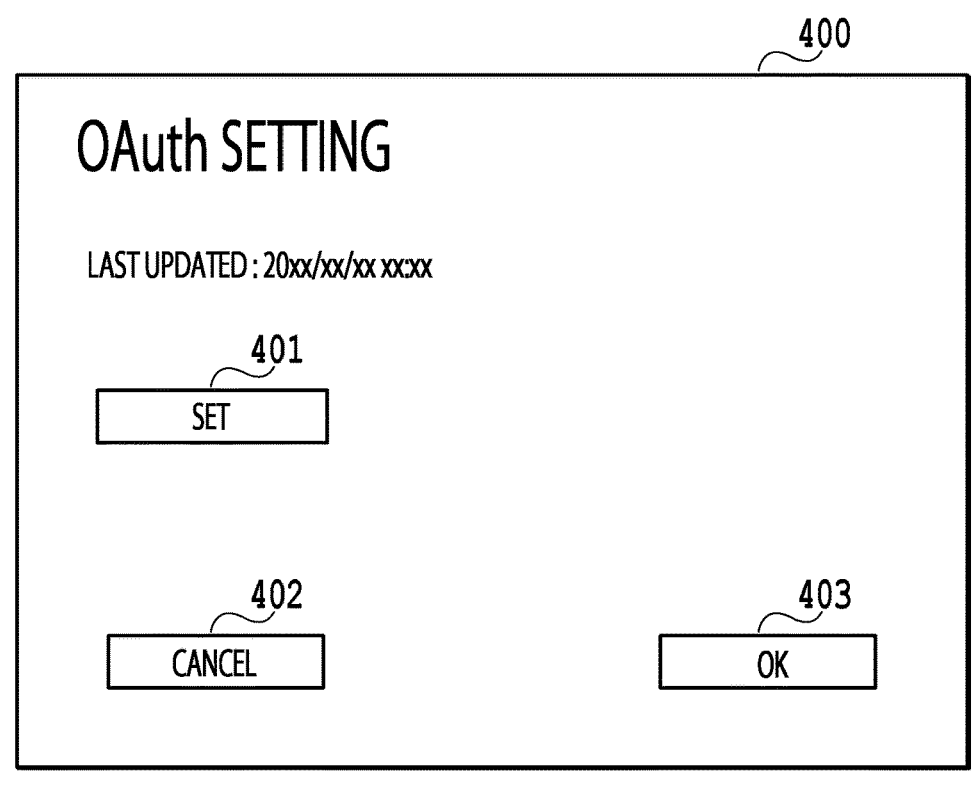
FIGS. 4A and 4B are diagrams illustrating examples of setting screens of OAuth 2.0.
Figure 4B:
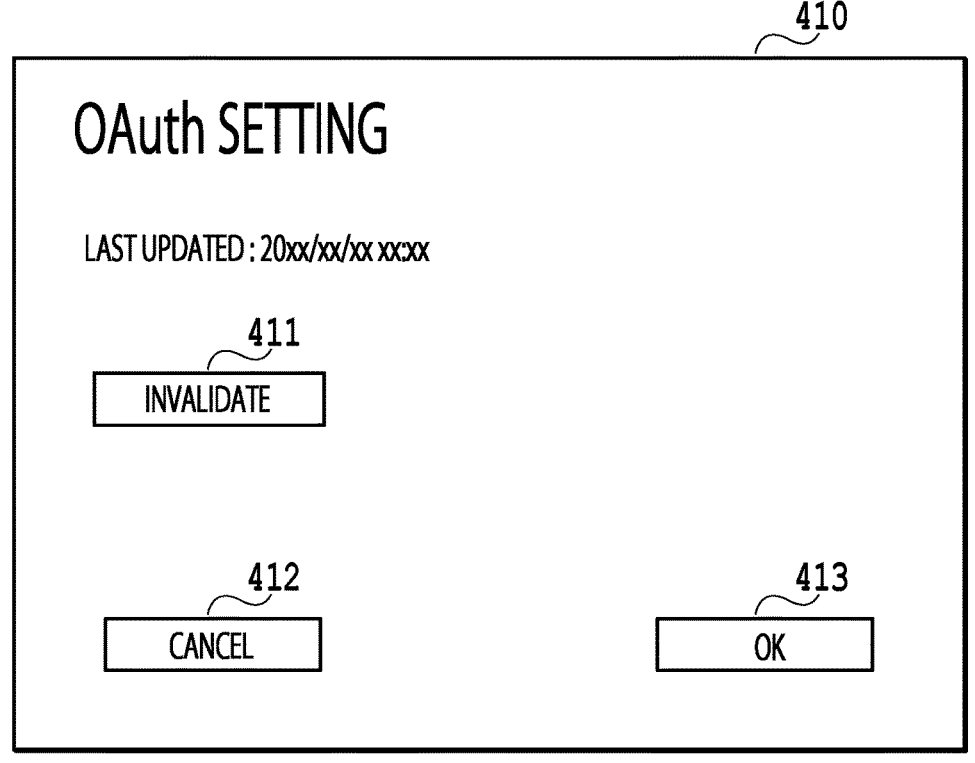
Figure 5A:
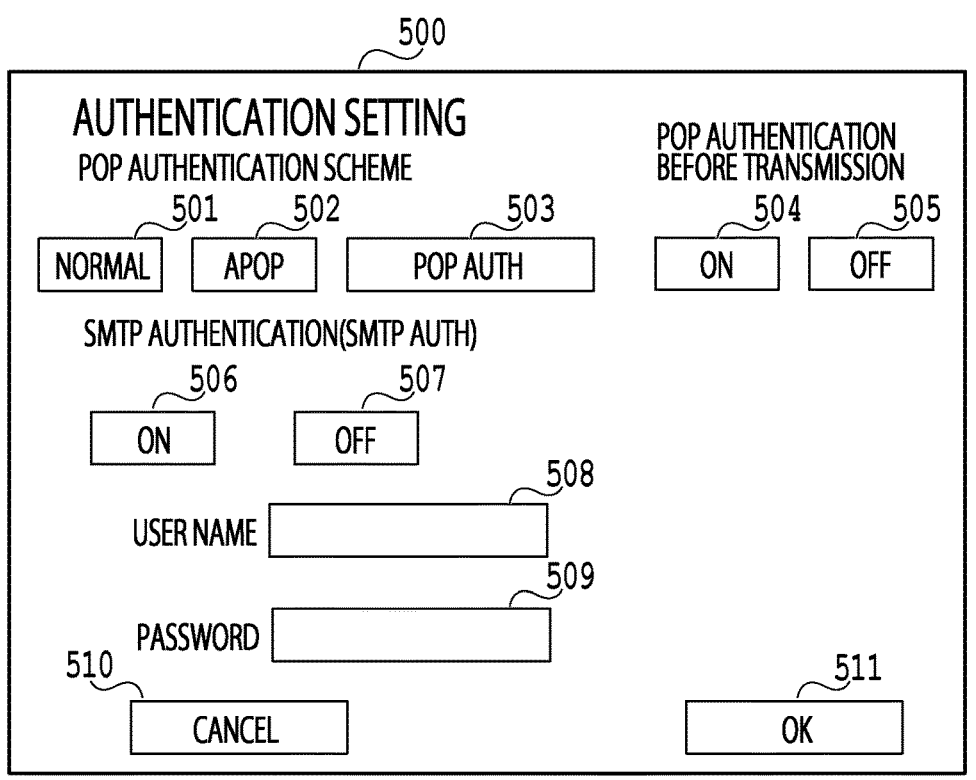
FIGS. 5A and 5B are diagrams illustrating examples of setting screens of server connection other than OAuth 2.0.
Figure 5B:
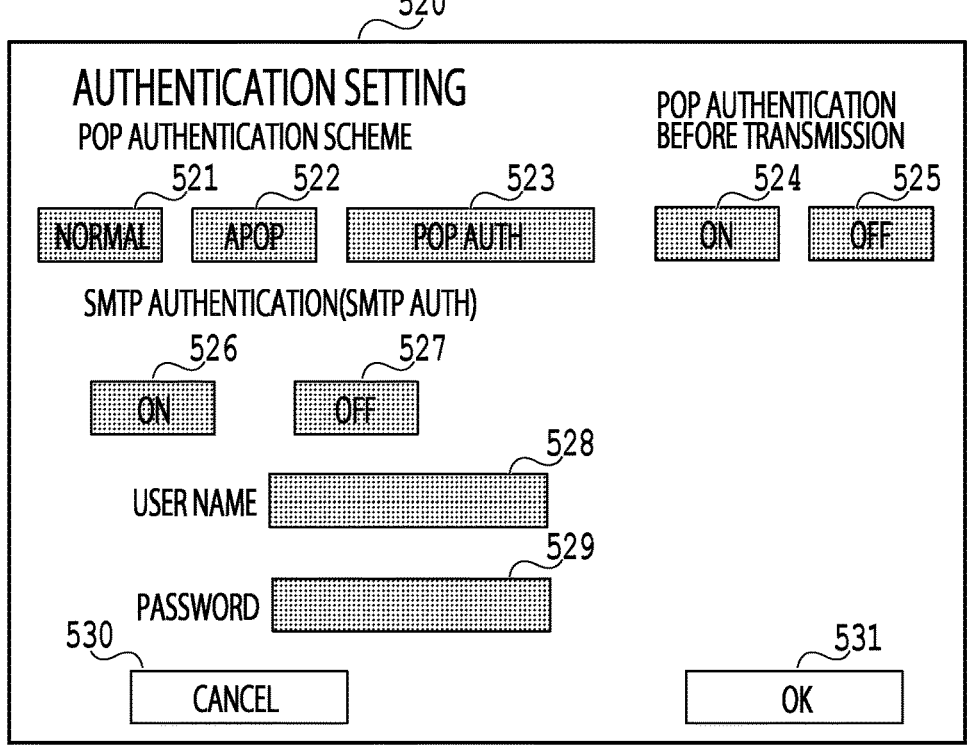
Figure 6:
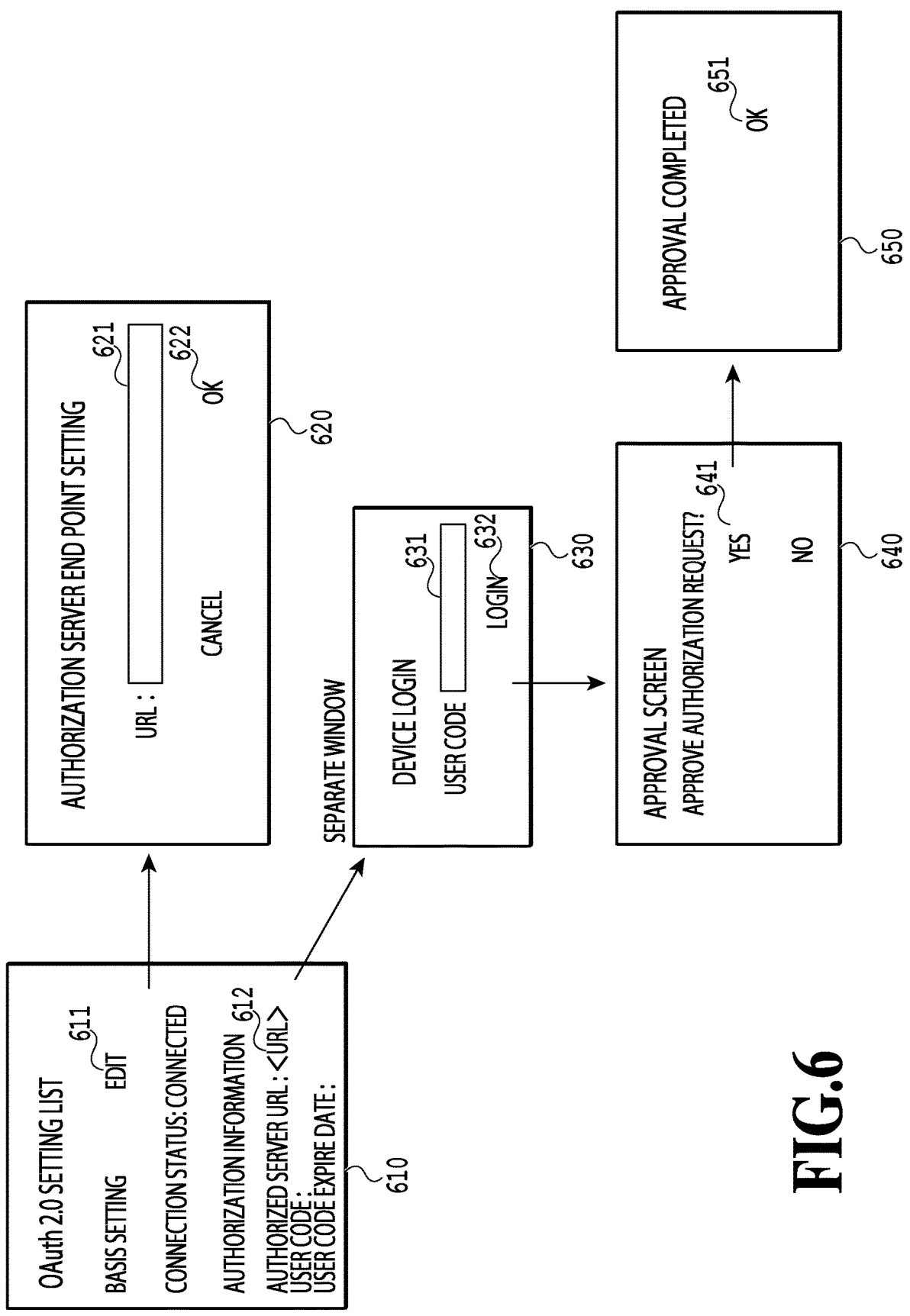
FIG. 6 is a diagram illustrating an example of a setting screen of OAuth 2.0.

FIG. 3 is a flowchart illustrating an example of setting finalization processing of OAuth 2.0, FIGS. 4A and 4B are diagrams illustrating examples of setting screens of OAuth 2.0, which are displayed on a web browser of a PC. FIGS. 5A and 5B are diagrams illustrating examples of setting screens of server connection other than OAuth 2.0, which are displayed on the display unit 120 of the image processing apparatus. FIG. 6 is a diagram illustrating examples of setting screens of OAuth 2.0, which are displayed on the web browser of the PC, following FIGS. 4A and 4B. The setting finalization processing of OAuth 2.0, which is server connection setting having a high security level, will be described below with reference to FIGS. 3, 4A, 4B, 5A, 5B, and 6.

FIG. 3 is a flowchart when the setting finalization processing of OAuth 2.0 is performed. The processing illustrated in FIG. 3 is implemented as the CPU 100 functions as each functional component illustrated in FIG. 2 as described above. In other words, the flowchart of FIG. 3 is implemented as the CPU 100 reads a computer program stored in the ROM 104 or the like onto the RAM 102 and executes the computer program. Functions of some or all steps in FIG. 3 may be implemented by a hardware component such as an ASIC or an electronic circuit. Symbol "S" in description of each processing means a step in the flowchart diagram (this is the same for any flowchart diagram to be described later in the present specification).

The processing illustrated in FIG. 3 is processing performed in response to reception of an instruction from the user for displaying a server connection setting screen of OAuth 2.0 by the image processing apparatus 1. At S301, the button press-down reception unit 203 determines whether press-down of a button for finalizing OAuth 2.0 setting is sensed. The processing proceeds to S302 in a case where the button press-down reception unit 203 determines that press-down of the button for finalizing OAuth 2.0 setting is sensed at S301. The processing proceeds to S306 in a case where the button press-down reception unit 203 determines that no press-down of the button for finalizing OAuth 2.0 setting is sensed. The button for finalizing OAuth 2.0 setting is an OK button 403 that is pressed down after a "set" button 401 is pressed down and various kinds of setting are completed as described later with reference to FIG. 4A.

In the present embodiment, a setting instruction of OAuth 2.0 is received by the image processing apparatus 1 through the LAN from a PC or the like different from the image processing apparatus 1. Any server connection setting other than OAuth 2.0 is received by the image processing apparatus 1 through a local UI (the display operation unit 12) included in the image processing apparatus 1. In OAuth 2.0 setting, the number of characters to be input by the user tends to be large. Operability potentially degrades depending on the sizes of a keyboard and a screen used on the local UI of the image processing apparatus 1. Thus, an example in which OAuth 2.0 setting is performed through a PC will be described in the present embodiment, but OAuth 2.0 setting may be performed through the local UI of the image processing apparatus 1. Moreover, any server connection setting other than OAuth 2.0 may be performed through a PC. OAuth 2.0 setting may be performed on the same screen as that for any server connection setting other than OAuth 2.0 or may be performed on any other screen.

In a case where the button press-down reception unit 203 determines that press-down of the button for finalizing OAuth 2.0 setting is sensed, the security level specification unit 204 specifies that server connection setting having a high security level is selected. A high security level means a level higher than a predetermined level among security levels classified in stages. As described above, the security level of POP and SMTP-AUTH is defined as the first level, and the predetermined level is defined as the first level. In this case, OAuth 2.0 is server connection setting having a security level higher than the first level (predetermined level).

FIGS. 4A and 4B illustrate examples of OAuth 2.0 setting screens displayed when the OAuth 2.0 setting screens are selected on a web browser of a PC. FIG. 4A is an example of a setting screen 400 before OAuth 2.0 is set, and FIG. 4B is an example of a setting screen 410 after OAuth 2.0 is set. The processing illustrated in FIG. 3 is started in response to, for example, display of the setting screen 400 illustrated in FIG. 4A. For example, assume a state in which a non-illustrated setting screen of the image processing apparatus 1 as a setting target apparatus is displayed on the web browser of the PC. In such a state, the setting screen 400 in FIG. 4A is displayed in response to selection of an item of "OAuth 2.0 setting" by the user through the web browser. FIG. 4A is an example of a screen on which server connection setting is performed in a case where the image processing apparatus 1 is connected to a mail server. The server connection setting screen is provided for each server to be connected so that server connection setting can be individually performed for each server.

The "set" button 401 for setting OAuth 2.0, a cancel button 402, and the OK button 403 are disposed on the setting screen in FIG. 4A. In the present embodiment, various kinds of processing for setting OAuth 2.0 are performed as described later with reference to FIG. 6 in a case where the "set" button 401 for setting OAuth 2.0 is pressed down. Then, in a case where the OK button 403 is selected by the user through the web browser after various kinds of setting are completed, information indicating selection of the button for finalizing OAuth 2.0 setting by the user is transferred to the image processing apparatus 1. The button press-down reception unit 203 of the image processing apparatus 1 determines, based on the information, that press-down of the button for finalizing OAuth 2.0 setting is sensed at S301. In other words, the processing proceeds to S302 when the OK button 403 is pressed down after various kinds of setting are performed in response to press-down of the "set" button 401. In a case where OAuth 2.0 setting is performed through the local UI of the image processing apparatus 1 as described above, the button press-down reception unit 203 may determine whether press-down of an equivalent button on the local UI is sensed.

At S302, the server connection setting storage unit 208 determines whether server connection setting other than OAuth 2.0 is already set. The processing proceeds to S303 in a case where the server connection setting storage unit 208 determines that server connection setting other than OAuth 2.0 is already set, and the processing proceeds to S304 in a case where the server connection setting storage unit 208 determines that no server connection setting other than OAuth 2.0 is already set.

At S303, the server connection setting finalization unit 207 invalidates the already set server connection setting other than OAuth 2.0, The already set server connection setting other than OAuth 2.0 is invalidated to prioritize OAuth 2.0 setting. Invalidating of server connection setting means control to disable the enabled server connection setting. For example, a user name and a password are registered and stored depending on server connection setting as described later. At S303, the registered and stored user name and password are not deleted but kept stored. In a case where the invalidated server connection setting is re-enabled later, a state in which the registered and stored user name and password are set is restored. After S303, the processing proceeds to S304. At S304, the server connection setting finalization unit 207 finalizes OAuth 2.0 setting.

Subsequently at S305, the server connection setting selection control unit 205 performs setting for graying out a setting region for any server connection setting other than OAuth 2.0 on the server connection setting screen. In the present embodiment, a server connection setting screen for server connection other than OAuth 2.0 is displayed on the local UI of the image processing apparatus 1. Thus, the server connection setting selection control unit 205 performs setting for graying out a setting region for any server connection setting other than OAuth 2.0 on a server connection setting screen displayed on the display unit 120. In accordance with the setting, the server connection setting screen display unit 201 grays out a setting region for any server connection setting other than OAuth 2.0, FIGS. 5A and 5B are examples of setting screens of server connection other than OAuth 2.0, which are displayed when server connection setting is selected on the local UI of the image processing apparatus 1. In the examples, server connection setting for a mail server is illustrated. FIG. 5A is a setting screen 500 before gray-out is performed. POP authentication setting buttons 501 to 505 and SMTP-AUTH authentication setting buttons 506 to 507 are displayed on the setting screen 500. In addition, text boxes 508 and 509 for inputting a user name and a password to be used for SMTP-AUTH authentication are displayed on the setting screen 500. Further, a cancel button 510 for canceling change of the server connection setting and an OK button 511 for finalizing change of the server connection setting are displayed. The setting screen 500 in the display form illustrated in FIG. 5A is, for example, a setting screen before OAuth 2.0 setting is performed. The user of the image processing apparatus 1 can perform various kinds of server connection setting through the setting screen 500.

FIG. 5B is a setting screen 520 after gray-out is performed at S305. The setting screen 520 is the same setting screen as the setting screen 500 except for setting items are grayed out. POP authentication setting buttons 521 to 525 and SMTP-AUTH authentication setting buttons 526 to 527 are displayed on the setting screen 520. In addition, text boxes 528 and 529 for inputting a user name and a password to be used for SMTP-AUTH authentication are displayed on the setting screen 520. Further, a cancel button 530 for canceling change of the server connection setting and an OK button 531 for finalizing change of the server connection setting are displayed. In the present embodiment, in a case where OAuth 2.0 is set, the server connection setting screen display unit 201 grays out all buttons other than the cancel button 530 and the OK button 531 in FIG. 5B. In the present embodiment, grayed-out items are configured to be unable to be selected by the user. In other words, setting is configured to be unable to be updated even when grayed-out items are pressed down (touched) by the user. With such control, OAuth 2.0 setting can be maintained in accordance with setting of OAuth 2.0. Thus, it is possible to prevent unintentional change of once-set server connection setting having a high security level to setting having a low security level.

As described above, for example, in a case where values are already registered in the text boxes 528 and 529 for inputting a user name and a password, the values are maintained even in the grayed-out state. In this case, the values may be or may not be displayed in the text boxes 528 and 529 for inputting a user name and a password in the grayed-out state. After S305, the processing of the flowchart illustrated in FIG. 3 ends.

At S306, the server connection setting screen display unit 201 determines whether display of the setting screen 400 illustrated in FIG. 4A has ended. For example, in a case where the cancel button 402 is pressed down on the setting screen 400 in FIG. 4A, it is determined that display of the setting screen 400 has ended, and the processing of the flowchart illustrated in FIG. 3 ends. In a case where it is not determined that display of the setting screen 400 has ended, the processing returns to S301 and is repeated. In a case where the cancel button 402 is selected by the user through the web browser, information indicating selection of the cancel button 402 is transferred to the image processing apparatus 1 as in a case where the OK button 403 is pressed down. The button press-down reception unit 203 of the image processing apparatus 1 determines, based on the information, that the cancel button 402 is pressed down at S306, and notifies a setting screen end instruction to the server connection setting screen display unit 201.

In the processing of the flowchart in FIG. 3, the example in which the processing at S302 and later is performed based on press-down of the OK button 403 after various kinds of setting are performed in response to press-down of the "set" button 401 is described above. However, the present invention is not limited to the example. For example, the processing at S302 and later may be performed in response to press-down of the "set" button 401. In other words, the processing at S302 and later may be performed in response to determination that press-down of a button for OAuth 2.0 setting is sensed irrespective of whether an actual OAuth 2.0 setting is completed.

<OAuth 2.0 Setting Processing>

FIG. 6 is a diagram illustrating various screen examples displayed on the web browser of the PC after the "set" button 401 is pressed down on the setting screen 400 in FIG. 4A. Once the "set" button 401 is pressed down, various kinds of processing for the image processing apparatus 1 to obtain an access token from an authorization server are performed.

A screen 610 is a setting screen for the image processing apparatus 1, which is displayed on the web browser of the PC. A screen 620 is displayed on the web browser when an edit button 611 is pressed down on the screen 610 by the user. The user inputs an end point URL corresponding to the authorization server in a region 621 (S1). Thereafter, when an OK button 622 is pressed down by the user, device approval request processing of the image processing apparatus 1 is started for the authorization server indicated by the end point URL (S2). Specifically, the image processing apparatus 1 requests the authorization server indicated by the end point URL to issue information including a verification URL, a user code, a message, and an expire date (S3). In response to the request, information including the verification URL, the user code, the message, and the expire date is transmitted from the authorization server to the image processing apparatus 1 and received by the image processing apparatus 1 (S4).

The image processing apparatus 1 presents the information received from the authorization server to the user (S5). The information issued by the authorization server and received by the image processing apparatus 1 is displayed on the screen 610 by the web browser of the PC. When a URL 612 that is the verification URL notified by the authorization server is selected on the web browser by the user, a screen 630 is displayed in a separate window on the web browser (S6). The user inputs, in accordance with the message on the screen 630, the user code notified to the image processing apparatus 1 by the authorization server and presses down a login button 632 (S7). The authorization server, which manages the verification URL, verifies the input user code and displays a screen 640 on the web browser if there is no problem (S8).

The image processing apparatus 1 transmits a device code received from the authorization server to the authorization server and requests the authorization server to issue an access token (S9). The access token issue request (S9) by the image processing apparatus 1 is performed by the image processing apparatus 1 between S4 and S8 described above in parallel.

A query of whether to approve an authorization request is performed for the user on an approval screen of the screen 640. Authorization by the user is completed when the user presses down a "yes" button 641 on the web browser. In response to completion of authorization by the user, the authorization server transmits an access token, the expire date of the access token, and a refresh token to the image processing apparatus 1 at the transmission source of the device code associated with the user code (S10). The image processing apparatus receives and stores the access token, the expire date of the access token, and the refresh token from the authorization server (S11). In response to press-down of the "yes" button 641, a screen 650 is displayed on the web browser. When an OK button 651 on the screen 650 is pressed down by the user, the web browser returns to the setting screen 400 in FIG. 4A. Then, when the OK button 403 is pressed down, YES at S301 is determined as described above.

The image processing apparatus 1 having completed OAuth 2.0 setting in this manner performs processing by using the stored access token when communicating with a mail server. The access token is set with an expire date and updated by using the refresh token before the expire date performed.

The above-described access token obtainment processing by the image processing apparatus 1 is merely exemplary and the present invention is not limited to the example. As described above, OAuth 2.0 setting processing may be performed by using the local UI of the image processing apparatus 1.

<OAuth 2.0 Setting Invalidating Processing>

Figure 7:
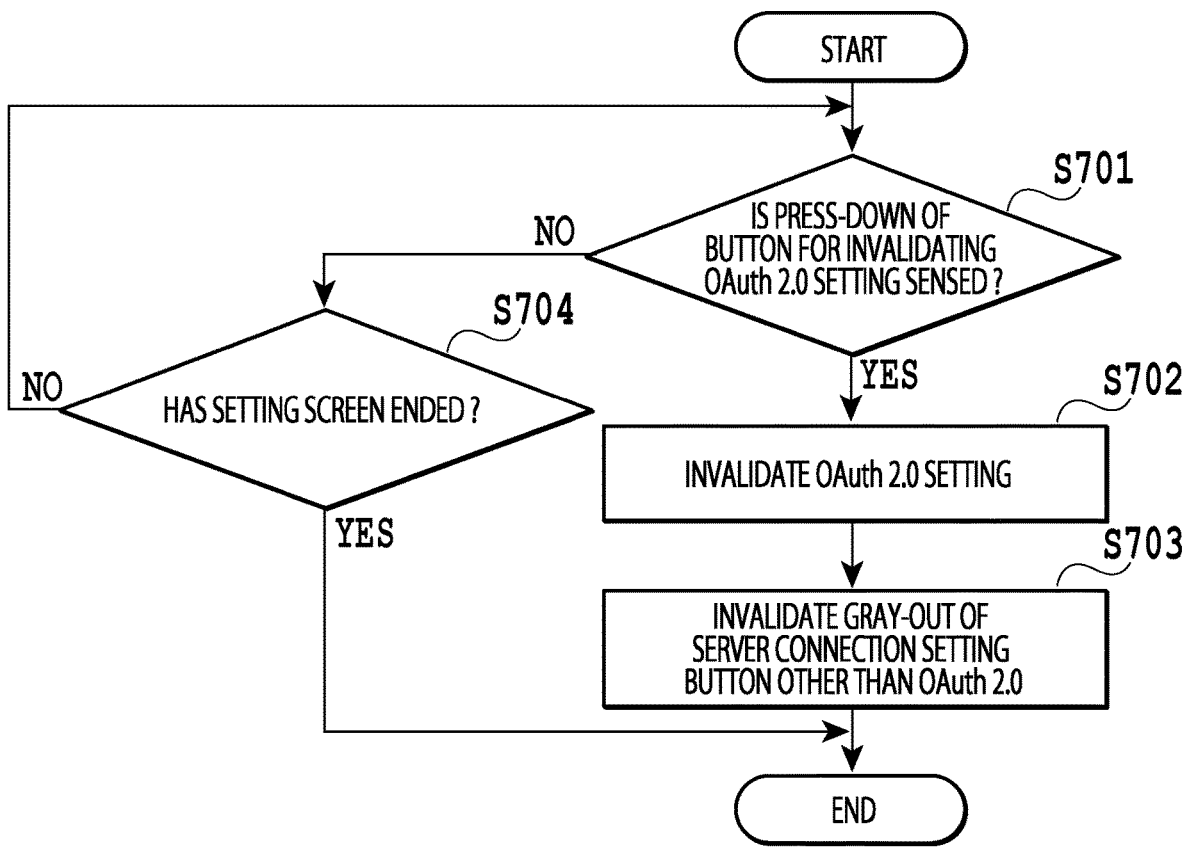
FIG. 7 is a diagram illustrating an example of a flowchart when setting invalidating processing of OAuth 2.0 is performed.

FIG. 7 is a diagram illustrating an example of a flowchart when OAuth 2.0 setting invalidating processing is performed. The OAuth 2.0 setting invalidating processing will be described below with reference to FIGS. 4A, 4B, 5A, 5B, and 7. The processing illustrated in FIG. 7 is implemented as the CPU 100 functions as each functional component illustrated in FIG. 2 as described above. In other words, the flowchart in FIG. 7 is implemented as the CPU 100 reads a computer program stored in the ROM 104 or the like onto the RAM 102 and executes the computer program. Functions of some or all steps in FIG. 7 may be implemented by a hardware component such as an ASIC or an electronic circuit.

The processing illustrated in FIG. 7 is processing performed in response to reception of an instruction to display the server connection setting screen of OAuth 2.0 from the user in a state in which OAuth 2.0 setting is set. FIG. 4B is the setting screen 410 after OAuth 2.0 is set, on which a "invalidate" button 411 for invalidating OAuth 2.0 setting is displayed. The processing illustrated in FIG. 7 is performed when the setting screen 410 in FIG. 4B is displayed.

At S701, the button press-down reception unit 203 determines whether press-down of the button for invalidating OAuth 2.0 setting is sensed on the setting screen 410. In other words, it is determined whether the "invalidate" button

411 on the setting screen 410 is pressed down. In a case where it is determined that press-down of the button for invalidating OAuth 2.0 setting is sensed, the processing proceeds to S702. In a case where it is determined that no press-down of the button for invalidating OAuth 2.0 setting is sensed, the processing proceeds to S704.

At S702, the server connection setting finalization unit 207 invalidates OAuth 2.0 setting. Subsequently at S703, the server connection setting selection control invalidating unit 206 invalidates gray-out of a setting region for any server connection setting other than OAuth 2.0 on the server connection setting screen. Specifically, display setting changes from a state in which a setting region for any server connection setting other than OAuth 2.0 is grayed out as illustrated in FIG. 5B to a state in which the gray-out is invalidated as illustrated in FIG. 5A. As described above, in a case where inputting, selection, or the like of an item is already performed in a setting region for any server connection setting other than OAuth 2.0, the screen in FIG. 5A is restored with setting thereof maintained. Then, the processing in FIG. 7 ends.

At S704, the server connection setting screen display unit 201 determines whether display of the setting screen 410 illustrated in FIG. 4B has ended. For example, in a case where a cancel button 412 is pressed down on the setting screen 410 in FIG. 4A, it is determined that display of the setting screen 410 has ended, and the processing of the flowchart illustrated in FIG. 7 ends. In a case where it is not determined that display of the setting screen 410 has ended, the processing returns to S701 and is repeated.

As described above, according to the present embodiment, it is possible to improve security. Specifically, it is possible to preferentially set server connection setting having a high security level. More specifically, in the present embodiment, in a case where server connection setting is set to OAuth 2.0 having a high security level, processing of preventing setting of other server connection setting is performed. Accordingly, it is possible to prevent the user from unintentionally changing once-set server connection setting having a high security level to any other server connection setting, thereby improving security.

In the present embodiment, the example in which gray-out is performed as a means for preventing setting of server connection setting other than OAuth 2.0 is described above, but the present invention is not limited to the example. For example, a setting region for any server connection setting other than OAuth 2.0 may not be displayed. Alternatively, a popup for notifying that setting change is impossible may be displayed at transition to a screen for server connection setting other than OAuth 2.0.

Second Embodiment

In the example described above in the first embodiment, in a case where OAuth 2.0 as server connection setting having a high security level is set, a setting region for any other server connection setting is grayed out to prevent setting of the other server connection setting. However, in some cases, server connection setting needs to be changed as a trial while it is understood that the security level will be lowered.

In the present embodiment, processing of graying out a setting region for any server connection setting other than OAuth 2.0 in a case where OAuth 2.0 is set as described above in the first embodiment is not performed. Instead, in the present embodiment, in a case where a setting button for server connection setting other than OAuth 2.0 is pressed down by the user after OAuth 2.0 is set, a screen for checking that change is to be made from a setting having a high security level is displayed. Accordingly, change of server connection setting is prevented in an example described below.

The basic configuration is the same as in the example described above in the first embodiment, and thus description thereof is omitted. Difference from the first embodiment is that finalization processing of server connection setting by the server connection setting finalization unit 207 is changed from FIG. 3 to FIGS. 8A and 8B. The difference from the first embodiment will be mainly described below.

Figure 8A:
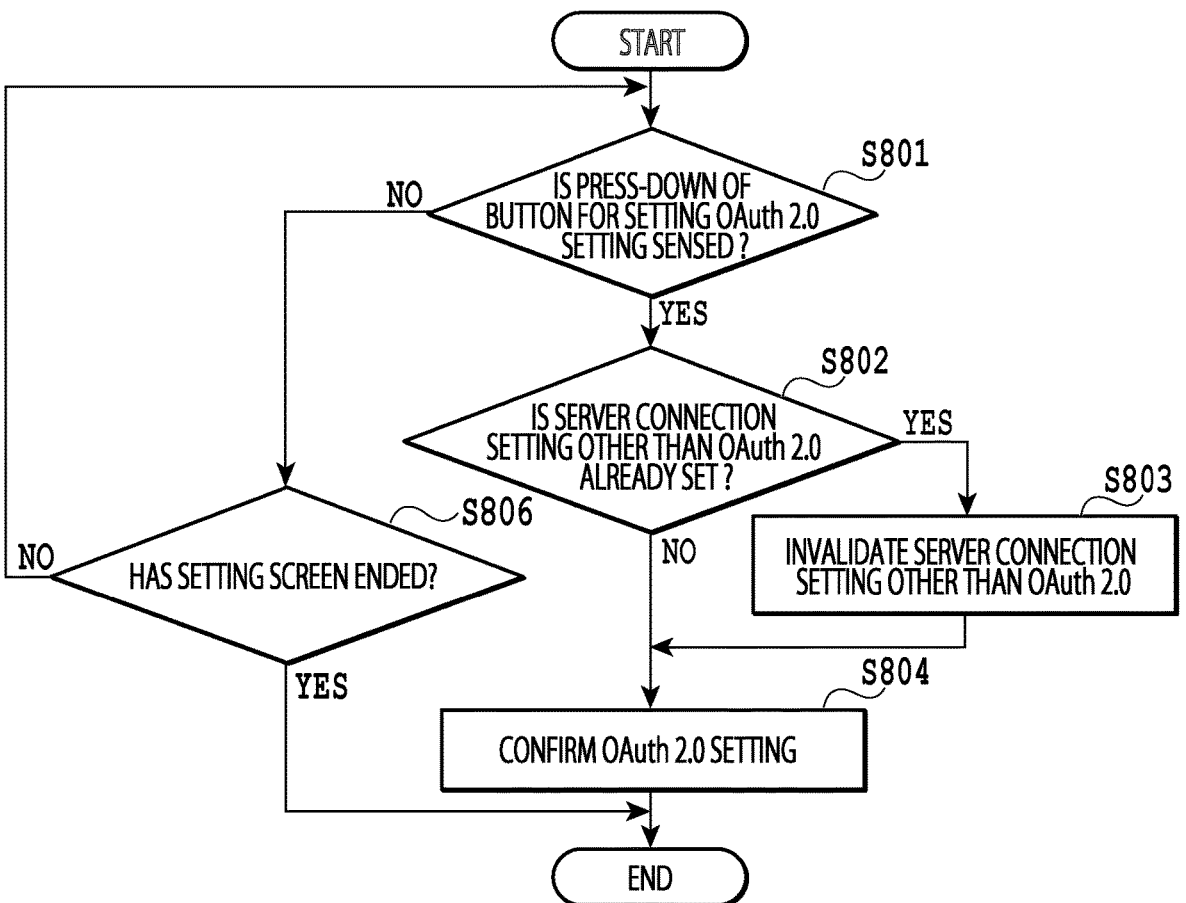
FIGS. 8A and 8B are flowcharts when setting finalization processing of OAuth 2.0 is performed.
Figure 8B:
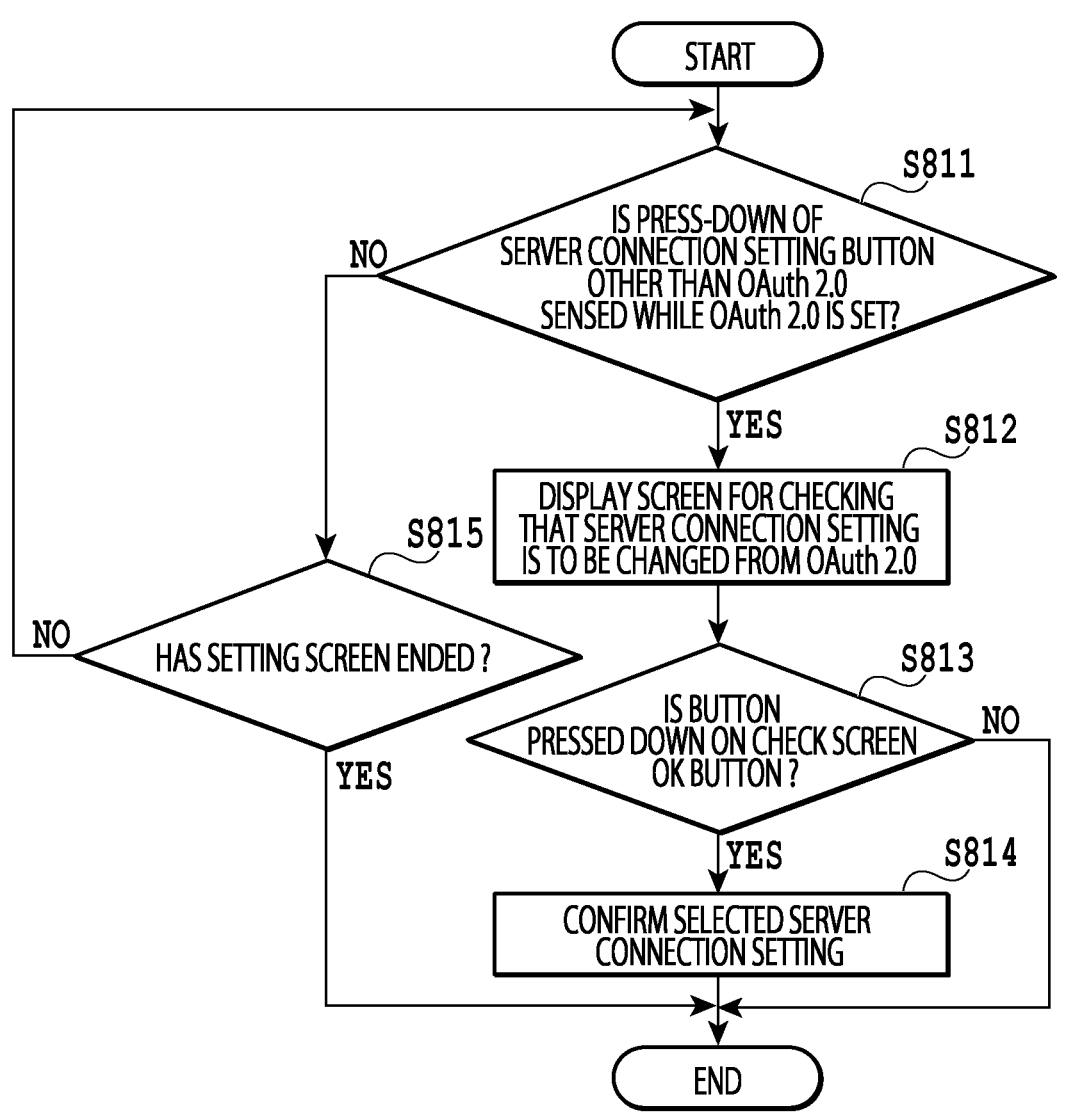

FIGS. 8A and 8B are flowcharts when the setting finalization processing of OAuth 2.0 is performed. The processing illustrated in FIGS. 8A and 8B is implemented as the CPU 100 functions as each functional component illustrated in FIG. 2 as described above. In other words, the flowcharts in FIGS. 8A and 8B are each implemented as the CPU 100 reads a computer program stored in the ROM 104 or the like onto the RAM 102 and executes the computer program. Functions of some or all steps in FIGS. 8A and 8B may be implemented by a hardware component such as an ASIC or an electronic circuit.

The processing illustrated in FIG. 8A is processing performed in response to reception of an instruction to display the server connection setting screen of OAuth 2.0 from the user. Processing at S801 to S804 and S806 in FIG. 8A is the same as the processing at S301 to S304 and S306 in FIG. 3, respectively. In the processing in FIG. 8A, the above-described processing of graying out any server connection setting button other than OAuth 2.0 at S305 in FIG. 3 is not performed.

The processing illustrated in FIG. 8B is processing performed in response to reception of an instruction to display the server connection setting screen while OAuth 2.0 is set. Specifically, the processing illustrated in FIG. 8B is processing performed when the setting screen 500 in FIG. 5A is displayed on the display unit 120 of the image processing apparatus 1 while OAuth 2.0 is set.

At S811, the button press-down reception unit 203 determines whether press-down of a setting button for server connection setting other than OAuth 2.0 is sensed on the server connection setting screen on the setting screen 500 while OAuth 2.0 is set. For example, it is determined whether press-down of the OK button 531 is sensed after an input is performed on the setting screen 500 in FIG. 5A by the user. The processing proceeds to S812 in a case where it is determined that press-down of a setting button for server connection setting other than OAuth 2.0 is sensed, or the processing proceeds to S815 otherwise.

Figure 9:
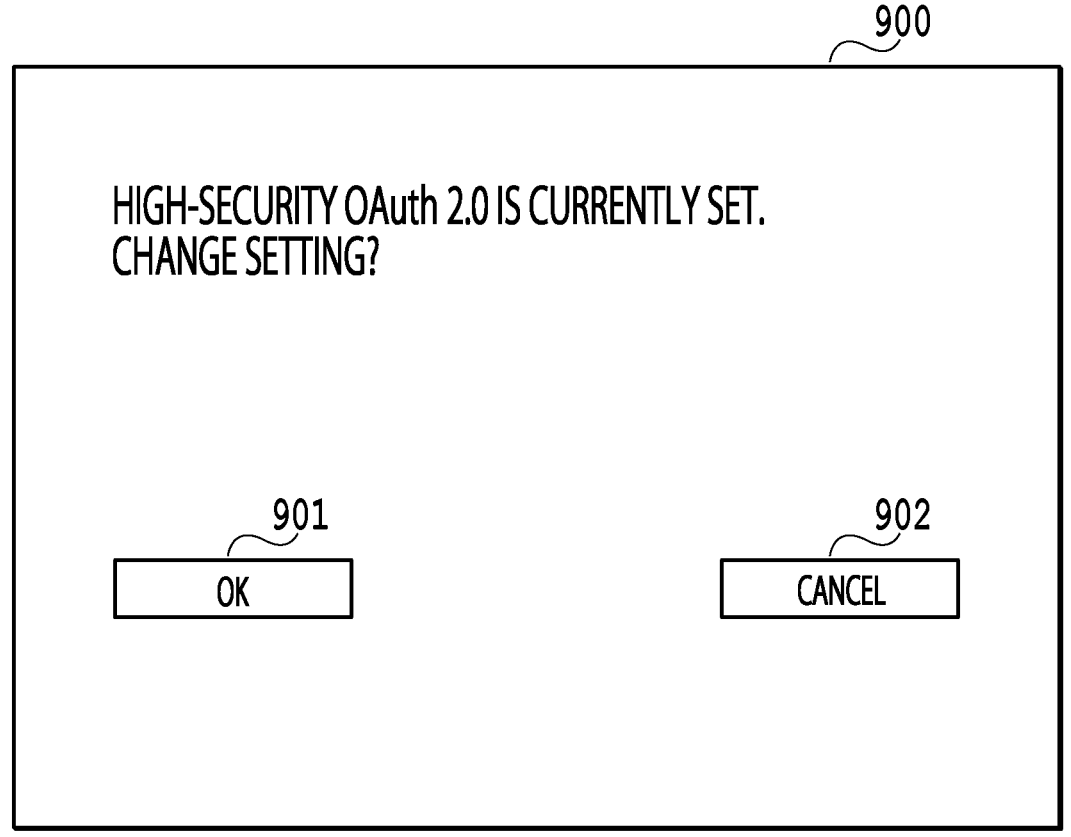
FIG. 9 is a diagram illustrating an example of a check screen.

At S812, the check screen display unit 202 displays a screen for checking that server connection setting is to be changed from OAuth 2.0, FIG. 9 is a diagram illustrating an example of a check screen 900. The check screen 900 illustrated in FIG. 9 is a screen displayed on a UI (in the present example, the local UI of the display unit 120 of the image processing apparatus 1) for performing server connection setting other than OAuth 2.0, In the example illustrated in FIG. 9, the check screen 900 displays a "OK" button 801 for finalizing that the server connection setting is to be changed and a "cancel" button 802 for canceling change of the server connection setting.

At S813, the button press-down reception unit 203 determines whether a button pressed down on the check screen 900 is the "OK" button 801. In a case where it is determined that the button pressed down on the check screen 900 is the "OK" button 801, the processing proceeds to S814. In a case where it is determined that the button pressed down on the check screen 900 is not the "OK" button 801, in other words, in a case where the "cancel" button 802 is pressed down on the check screen, the processing of the flowchart illustrated in FIG. 8B ends without setting change.

At S814, the server connection setting finalization unit 207 finalizes the server connection setting selected by the user. In a case where the user intends to continue the server connection setting although being warned, the user's intention is prioritized and processing of finalizing the server connection setting selected by the user is performed.

At S815, the server connection setting screen display unit 201 determines whether display of the setting screen 500 illustrated in FIG. 5A has ended. For example, in a case where the cancel button 510 is pressed down on the setting screen 500 in FIG. 5A, it is determined that display of the setting screen 500 has ended, and the processing of the flowchart illustrated in FIGS. 8A and 8B ends. In a case where it is not determined that display of the setting screen 500 has ended, the processing returns to S811 and is repeated.

As described above, in the present embodiment as well, server connection setting having a high security level can be preferentially set. More specifically, in the present embodiment, in a case where OAuth 2.0 having a high security level is set as server connection setting, processing of preventing setting of any other server connection setting is performed. Specifically, in a case where server connection setting other than OAuth 2.0 is performed by the user while OAuth 2.0 is set, a check screen is displayed to prevent setting of any other server connection setting. When the check screen 900 as illustrated in FIG. 9 is displayed, the user finalizes a setting after checking that the setting will change server connection setting having a high security level, and thus it is possible to prevent the user from unintentionally performing setting at a low security level.

Other Embodiments

In the above-described embodiments, an image processing apparatus such as a multi-function peripheral is described as an exemplary information processing apparatus. However, the information processing apparatus is not limited to an image processing apparatus but may be any apparatus capable of performing communication with another apparatus.

In the above description, first server connection setting having a low security level is POP or SMTP-AUTH as an example and second server connection setting having a high security level is OAuth 2.0 as an example, but the server connection setting are not limited to these examples. The present invention is applicable to any schemes having relative difference therebetween in the security level. The security level may be managed as a table or the like in the image processing apparatus in advance or may be set for each server connection setting by the user.

In the above-described embodiments, description is made in the relation with OAuth 2.0 setting, but processing different from that in the above-described embodiments may be performed in a case of server connection settings having low security levels. For example, in a case where setting of SMTP-AUTH is instructed while POP is set, the image processing apparatus 1 may perform processing of setting SMTP-AUTH.

In the above-described embodiments, a service server with which the information processing apparatus communicates by using an access token obtained by OAuth 2.0 is a mail server as an example, but the service server is not limited to the example. The information processing apparatus may perform, with a service server of an optional kind, processing using an access token obtained by OAuth 2.0.

In a case where there are a plurality of service servers using OAuth 2.0, processing described above in the embodiments may be performed for each service server connected.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-131771, filed Aug. 14, 2023, which is hereby incorporated by reference wherein in its entirety.

What is claimed is:

1. An information processing apparatus comprising:
one or more memories storing instructions; and
one or more processors that, upon execution of the stored instructions, perform the functions of:
receiving an instruction to set a first setting for executing authentication with a first server by a first authentication scheme having a security level at a first level;
executing authentication with the first server by the first authentication scheme based on reception of the instruction to set the first setting;
receiving an instruction to set a second setting for executing authentication with a second server by a second authentication scheme having a security level at a second level higher than the first level;
executing authentication with the second server by the second authentication scheme based on reception of the instruction to set the second setting; and
performing prevention control, based on reception of the instruction to set the second setting, to prevent reception of the instruction to set the first setting.

2. The information processing apparatus according to claim 1, wherein the performing the prevention control comprises performing at least one control out of first control that a region for receiving an operation for the instruction to set the first setting from a user cannot be operated by the user, second control that the region for receiving the operation for the instruction to set the first setting from the user is grayed out, and third control that the region for receiving the operation for the instruction to set the first setting from the user is not displayed.

3. The information processing apparatus according to claim 1, wherein in a case where the instruction to set the first setting is received, the prevention control is performed by outputting a predetermined notification.

4. The information processing apparatus according to claim 1, wherein in a case where the instruction to set the first setting is receive by the first reception unit received, the prevention control is performed by outputting a predetermined notification that a further instruction from a user can be received.

5. The information processing apparatus according to claim 4, wherein in a case where an instruction from a user based on the predetermined notification is the instruction to set the first setting, control is performed to set the first setting.

6. The information processing apparatus according to claim 1, wherein control is performed to disable the first setting in a case where the instruction to set the second setting is received in a state in which the first setting is set.

7. The information processing apparatus according to claim 5, wherein control is performed to re-enable the disabled first setting in a case where an instruction to disable the second setting already set is received.

8. The information processing apparatus according to claim 7, wherein
information of a particular setting item is stored in the information processing apparatus in a case where the first setting is set, and
control is performed to store the information of the particular setting item even in a case where the first setting is disabled, and to re-enable the information of the particular setting item in a case where the first setting is re-enabled.

9. The information processing apparatus according to claim 1, wherein the one or more processors further perform the functions of:
receiving an instruction to set a third setting for executing authentication with the first server by a third authentication scheme having a security level at the first level but different from the first authentication scheme; and
executing authentication with the first server by the third authentication scheme based on reception of the instruction to set the third setting,
wherein reception of the instruction to set the third setting is prevented in a state in which the second setting is set, but the instruction to set the third setting can be received in a state in which the first setting is set.

10. The information processing apparatus according to claim 1, wherein the first authentication scheme is Post Office Protocol (POP) or Simple Mail Transfer Protocol-Authentication (SMTP-Auth) and the second authentication scheme is Open Authorization 2.0 (OAuth 2.0).

11. The information processing apparatus according to claim 1, wherein the instruction to set the first setting is received from an external apparatus through a network.

12. The information processing apparatus according to claim 1, wherein the instruction to set the second setting is received based on reception of a predetermined operation for setting the second setting by a user on a predetermined region displayed on the information processing apparatus.

13. The information processing apparatus according to claim 1, wherein the first server is an authentication server, the second server is an authorization server, and communication with a resource server is enabled after authentication with the authorization server is performed by the second authentication scheme.

14. An information processing apparatus control method comprising:

receiving an instruction to set first setting for executing authentication with a first server by a first authentication scheme having a security level at a first level;

executing a first authentication with the first server by the first authentication scheme based on reception of the instruction to set the first setting;

receiving an instruction to set second setting for executing authentication with a second server by a second authentication scheme having a security level at a second level higher than the first level;

executing a second authentication with the second server by the second authentication scheme based on reception of the instruction to set the second setting; and performing, based on reception of the instruction to set the second setting, control to prevent reception of the instruction to set the first setting.

15. A non-transitory computer readable storage medium storing a program for causing an information processing apparatus that includes one or more memories storing instructions and one or more processors that execute the stored instructions to:

receive an instruction to set a first setting for executing authentication with a first server by a first authentication scheme having a security level at a first level;

execute authentication with the first server by the first authentication scheme based on reception of the instruction to set the first setting;

receive an instruction to set a second setting for executing authentication with a second server by a second authentication scheme having a security level at a second level higher than the first level;

execute authentication with the second server by the second authentication scheme based on reception of the instruction to set the second setting; and perform control, based on reception of the instruction to set the second setting, to prevent reception of the instruction to set the first setting.

* * * * *